United States Patent [19]

Azinger, Jr.

[11] 3,831,430
[45] Aug. 27, 1974

[54] DEVICE FOR MEASURING DENSITY AND DEW POINT OF A GAS

[75] Inventor: Frederick A. Azinger, Jr., Pittsburgh, Pa.

[73] Assignee: Westinghouse Electric Corporation, Pittsburgh, Pa.

[22] Filed: June 16, 1972

[21] Appl. No.: 263,562

[52] U.S. Cl. .............. 73/17 A, 73/30, 200/148 B
[51] Int. Cl. ..................... G01n 9/36, G01n 25/66
[58] Field of Search ............. 73/17, 29, 30; 62/5; 200/148 B, 148 R

[56] References Cited
UNITED STATES PATENTS

| | | | |
|---|---|---|---|
| 2,624,195 | 1/1953 | Van Alen | 73/17 |
| 2,680,371 | 6/1954 | Donath | 73/17 |
| 3,083,565 | 4/1963 | Jennings | 73/17 |
| 3,152,475 | 10/1964 | Ford, Jr. et al. | 73/17 |
| 3,281,814 | 10/1966 | Neuenhof | 73/17 |
| 3,379,848 | 4/1968 | Cloclaser, Jr. et al. | 200/148 |
| 3,460,373 | 8/1969 | Ford | 73/17 |

OTHER PUBLICATIONS

Hilsch "The Use of the Expansion of Gases in a Centrifugal Field as Cooling Process" in Review of Scientific Instruments Vol. 18, No. 2, Feb. 47, pg. 108–113.

*Primary Examiner*—Herbert Goldstein
*Attorney, Agent, or Firm*—H. G. Massung

[57] ABSTRACT

This invention uses a vortex tube or Hilsch tube in combination with a thermocouple to determine the apparent molecular weight or density of a gas mixture and the dew point of the gas mixture. The thermocouple has a flat planar configuration with one side highly polished for accurately indicating the dew point. The cold gas which is extracted from the Hilsch tube is used to cool the polished thermocouple until frost or dew is formed on the thermocouple. This indicates the dew point of the gas surrounding the polished surface of the thermocouple. The temperature of the thermocouple continues to drop until it indicates the exhaust temperature of the cold gas from the Hilsch tube. This output temperature is a function of the pressure and temperature of the incoming gas and the density of the gas. Thus if the incoming gas temperature and pressure are held constant the exhaust gas temperature is a function of the density of the gas mixture.

5 Claims, 12 Drawing Figures

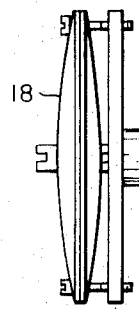
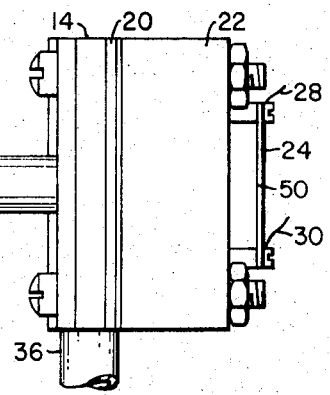
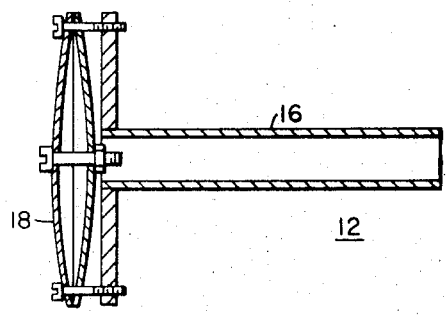
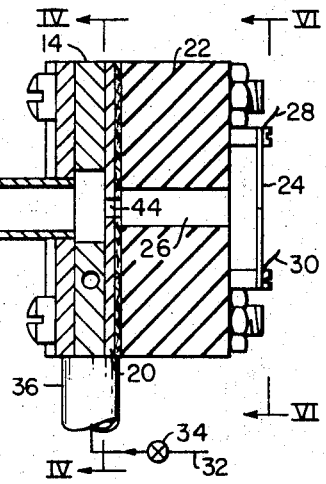
FIG. 1
FIG. 2
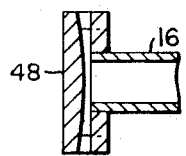
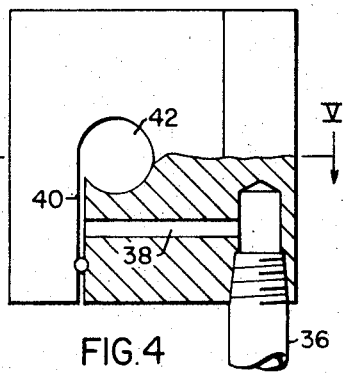
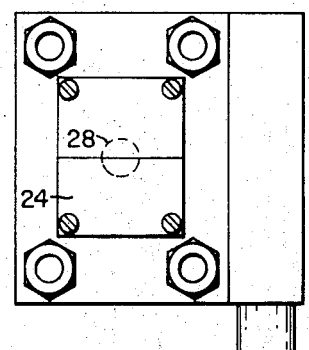
FIG. 3
FIG. 4
FIG. 6
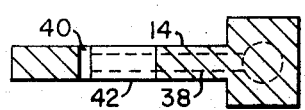
FIG. 5

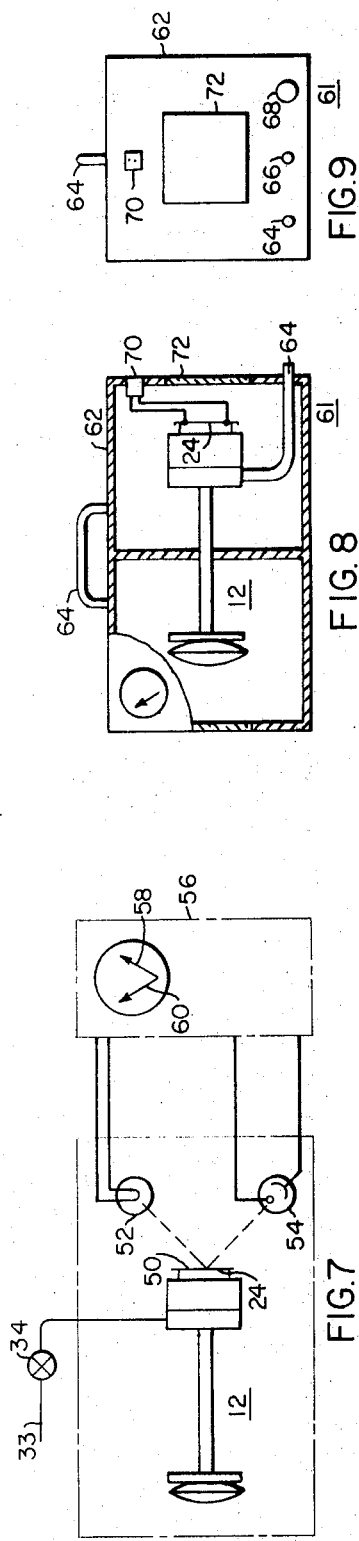
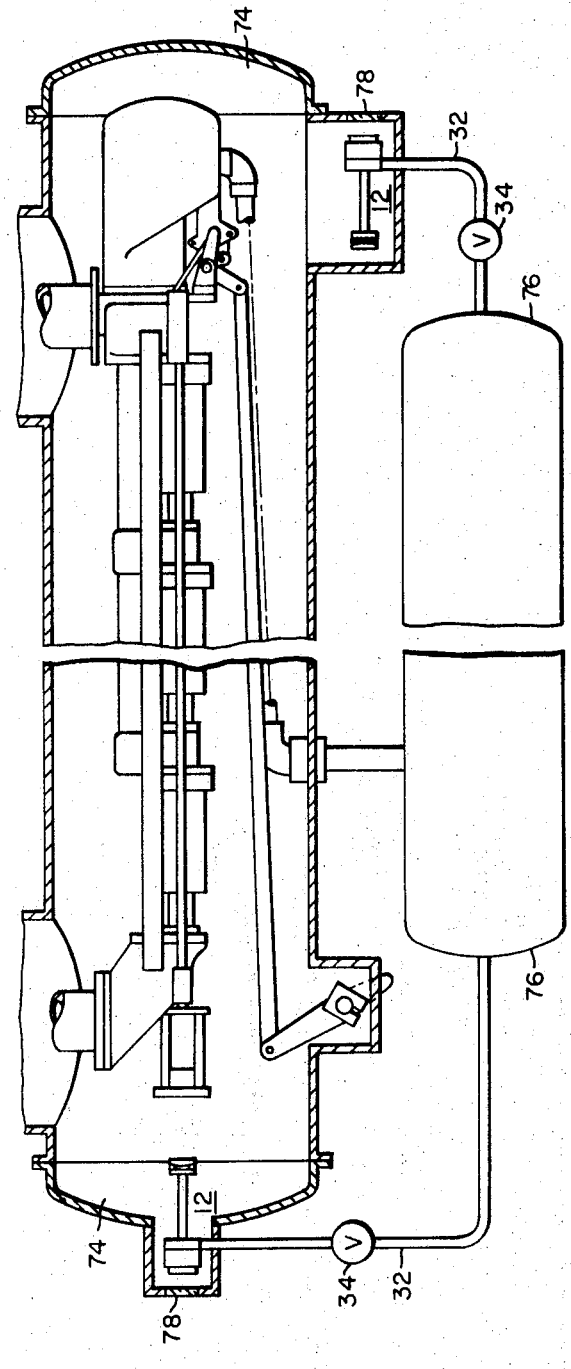

DEVICE FOR MEASURING DENSITY AND DEW POINT OF A GAS

BACKGROUND OF THE INVENTION

This invention relates to apparatus for measuring the density and the dew point of a gas. This invention is particularly appropriate for pressurized gas blast type circuit breakers in which the insulating gas is sulfur hexafluoride, $SF_6$. In this type of apparatus there is a danger of the insulating gas being contaminated with air. By determining the output temperature from the cold gas exit of a vortex tube this can be related to the density of the gas; the density thus determined indicates if the gas being tested has been contaminated by air. Due to the large difference in density between sulfur hexafluoride and air this apparatus works particularly well in this type of situation. This device is also very useful for measuring the density of corrosive gases. There are no moving parts in contact with the gas, and the apparatus can be constructed from materials which are not susceptible to corrosion by the gas whose density is being measured.

This invention in one embodiment utilizes a Hilsch tube. The Hilsch tube is a device into which is fed gas at a given pressure and temperature and through vortex expansion characteristics emits a stream of low temperature gas and a stream of high temperature gas. The principles of vortex tubes or Hilsch tubes are described in more detail in Review of Scientific Instruments, Volume 18, No. 2. February 1947, pp. 108-113, and in Scientific American, November 1958, pp. 145-146.

The inventor is aware of no other simple low cost density-determining device similar to the present invention. It is felt that this invention has significant advantages over prior art devices such as disclosed in U.S. Pat. No. 2,763,150, issued Sept. 18, 1956 to W. O. Bannen, and U.S. Pat. No. 3,152,475, issued Oct. 13, 1964 to S. H. Ford, Jr. et al., which utilize the Hilsch tube principle for a cooling apparatus to determine dew point. In the present invention, as opposed to the prior art, the cooled surface and the temperature determining device are one and the same, a flat thermocouple with a polished surface. The thermocouple is positioned close to the output of the cold gas exit of the vortex tube so there is little or no time delay in measuring the temperature of the cold gas.

SUMMARY OF THE INVENTION

This invention teaches an inexpensive rugged device which has no moving parts and has as a measuring signal the output from a thermocouple for determining the density and/or the dew point of a gas mixture. The density of the gas is determined by measuring the minimum output gas temperature of the device at a given input pressure and temperature. The dew point is determined by observing a flat thermocouple with a polished surface until frost or dew is formed on the polished surface, and then reading the temperature. This has significant advantages over the prior art methods of measuring dew points in that the surface on which the frost or dew is formed and the temperature indicating device are one and the same, a flat polished thermocouple. Any error due to a temperature differential between the surface on which frost or dew is formed and the temperature indicating device is eliminated. This arrangement also provides a dew point indicating device with a fast response time. That is, since the temperature indicating device and the surface on which dew is formed are integral, any time delay between the temperature of the sensing means and the temperature of the surface on which frost is formed is eliminated. Also, the thermocouple is thin and relatively light weight so that it responds rapidly to any change in the temperature of the cold gas output.

In the circuit breaker field, particularly in $SF_6$ breakers, the presence of air in sufficient quantities can seriously affect the breakers operation. It is important to determine the amount of air mixed with the $SF_6$ since this affects the withstand voltage of the gas mixture, and the ability of the gas mixture to interrupt current. The percentage of air can be determined by determining the density of the gas mixture. It is also important to determine the dew point of the gas mixture, since this determines the minimum temperature at which the breaker can operate without water vapor condensing on the internal surfaces of the breaker. Since the ratio of the density of air to $SF_6$ is great, this device can be used to determine the proportion of an air and $SF_6$ mixture at reasonable levels.

This invention makes use of a vortex tube, or Hilsch tube in combination with a planar thermocouple mounted near the cold gas exit. Gas at a given temperature and pressure is fed tangentially into the body portion of the Hilsch tube. This imparts a circular motion to the gas whereby the gas separates into a cold part in the center of the body surrounded by a rim of relatively hot gas. The cold gas exit is connected to the center of this chamber to allow the cold gas to pass out of the chamber only at the center of the chamber. This cold gas passes through the cold gas exit conduit and around the flat thermocouple which is mounted close to the open end of the cold gas exit passage. The flat thermocouple is mounted generally perpendicular to the cold gas exit passage. The temperature of the cold gas can be varied by varying the pressure of the input gas supply. The temperature of the cold gas output, with known pressure and temperature of an input gas, is used to determine the density of the gas mixture. The cold gas is also used for cooling a flat thermocouple so that the dew point of the gas surrounding the polished surface of the thermocouple can be determined.

This device has advantages over other prior art such as a simple rugged construction, with no moving parts that can be inexpensively manufactured. Another advantage of this device is that the temperature indicating means and the condensation surface are integral.

BRIEF DESCRIPTION OF THE DRAWINGS

Other advantages of the invention will be apparent from the following detailed description taken in consideration with the accompanying drawings in which:

FIG. 1 is a side view of a device embodying the teaching of the present invention;

FIG. 2 is a vertical section view of the device shown in FIG. 1;

FIG. 3 is a sectional view of a portion of the device shown in FIG. 2 in which the bellows valve has been replaced by a fixed orifice;

FIG. 4 is a view partially in section of a portion of the device shown in FIG. 2 along the lines IV—IV;

FIG. 5 is a sectional view of the portion shown in FIG. 4 along the line V—V;

FIG. 6 is an end view of the device shown in FIG. 1;

FIG. 7 is a schematic view of the apparatus of the present invention with a photo detection device for determining when the dew point is reached;

FIG. 8 is a portable apparatus embodying the present invention;

FIG. 9 is an end view of the device shown in FIG. 8;

FIG. 10 is a view of a portion of a dual pressure $SF_6$ circuit breaker with the apparatus of the present invention mounted thereon;

FIG. 11 is a view of an $SF_6$ circuit breaker with the apparatus of the present invention mounted thereon.

DESCRIPTION OF THE PREFERRED EMBODIMENT

Figure 12:
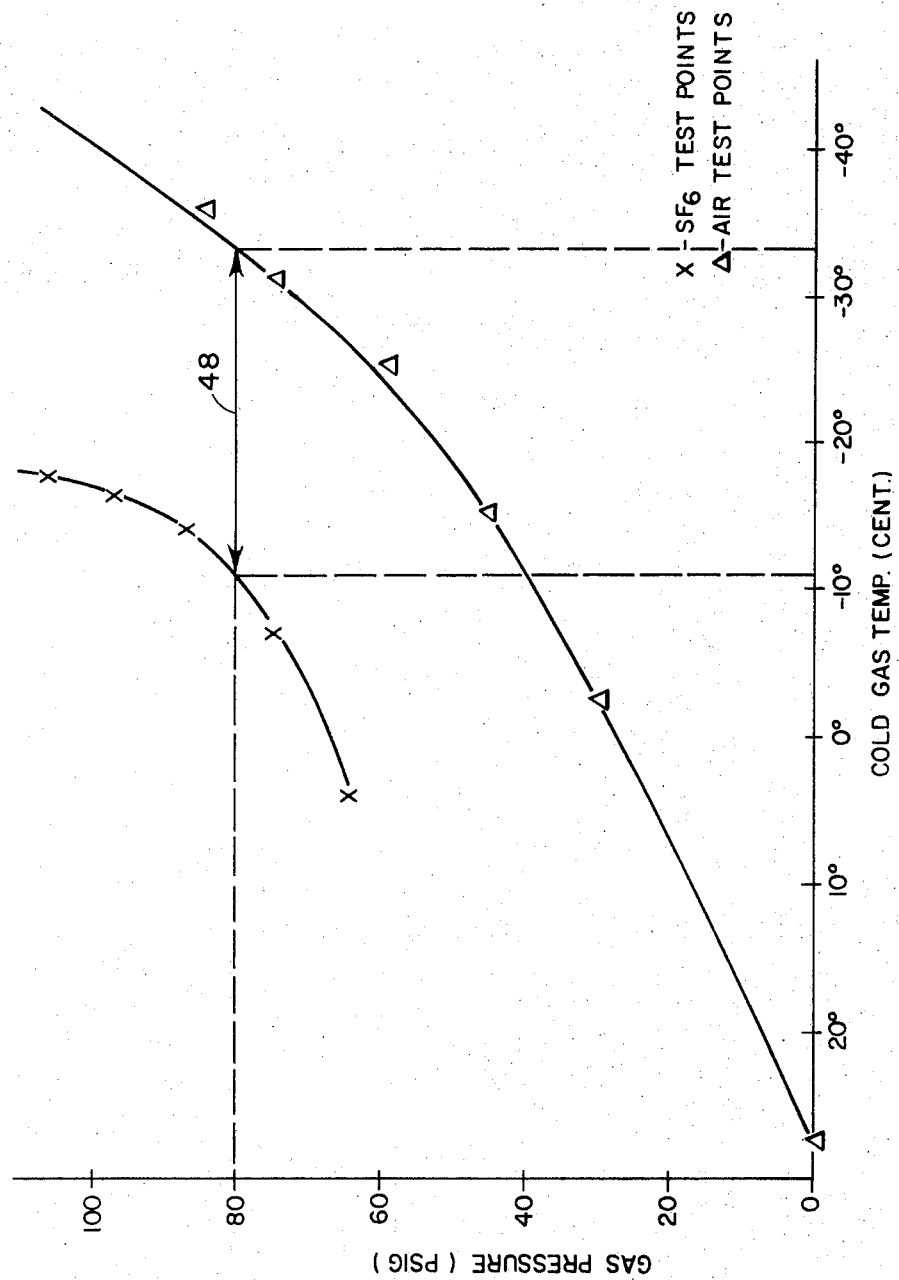
FIG. 12 is a graph showing experimental curves of output gas temperatures from the apparatus for $SF_6$ and air.

Referring now to the drawings and FIG. 1 in particular, there is shown a density and dew point determining device 12. The density determining device 12 comprising a main body portion 14, a hot gas exit tube 16, a bellows valve 18, a diaphragm 20, an insulating block 22, and a flat thermocouple 24. A cold gas conduit or exit 26 is present in the insulating block 22 for carrying the cold gas which passes through the diaphragm 20 to the flat thermocouple 24. Electrical conductors 28 and 30 extend from the back of thermocouple 24 to a temperature potentiometer (not shown) which determines the temperature being sensed by the thermocouple 24. A high pressure gas line 32 controlled by a valve 34 shown schematically in FIGS. 1 and 2, supplies gas to a high pressure gas pressure inlet 36.

In operation pressurized gas passes through the high pressure gas inlet 36, into the main body portion 14, through the circular passage 38, through the slopped portion 40, into the main vortex chamber 42. The pressurized gas passing through the slotted passage 40 enters the vortex chamber 42 tangentially, and a portion of the gas escapes with a screw-like motion along the wall 46 of the hot gas exit tube 16.

If the end of the hot gas exit tube 16 is completely open all of the gas entering through the gas inlet 36 will escape through the hot gas exit tubes 16. The circular motion of the gas entering the vortex chamber 42 will create a low pressure area near the center of the vortex chamber 42 and gas will be sucked in through the opening 44 in the diaphragm 20. Passage of a gas into the vortex chamber 42 through the opening 44 can be prevented by partially closing the bellows valve 18. By partially closing the bellows valve 18, it is possible to force a portion of the pressurized gas entering through inlet 36 to exit through openings 44. As the bellows valve 18 is further closed more gas is forced out through the opening 44. The gas which exits through the opening 44 comes from the center or axial portion of the vortex chamber 42. For reasons based on dynamic gas expansion, when pressurized gas enters the vortex chamber 40, tangentially, cold gas gathers at the center of the vortex chamber 40 surrounded by a rim of hot gas. Thus the portion of gas forced through the opening 44 is cold, in comparison with the gas coming in through the inlet 36, and in comparison to the gas exiting through the hot gas exit tube 16. As stated previously the gas which escapes through the hot gas exit tubes 16 moves with the screw-like motion along the wall 46 of the tube 16. The bellows valve 18 and the hot gas exhaust tube 16 from an opening which is closed in the center and open at the outer edges thereby permitting the hot gas moving along the walls of the tube 16 to easily escape. If the hot gas exit tube 16 is made sufficiently long so that the gas has lost most of its screw-like motion, due to internal friction, before exiting the valve construction is not important. For shorter hot gas exit tube 16 lengths it is important that the valve 18 is constructed so that the gas moving along the wall 46 be allowed to exit freely.

Referring now to FIG. 3, there is shown a portion of a density determining device 12 in which the bellows valve 18 is replaced by a non-adjustable metal disc 48. This is useful where the device is mounted in a corrosive atmosphere where it is desirable to have no moving or adjustable parts.

The temperature of the cold gas passing through the cold gas exit 26 can be varied by varying the temperature or pressure of the gas entering through the high pressure inlet 36, or by varying the setting of the bellows valve 18. The temperature of the cold gas passing through passage 26 is also dependent on the density of the gas entering the high pressure gas inlet. If the bellows valve 18 is replaced by a fixed opening as shown in FIG. 3, the temperature of the output gas passing through passage 26 is a function of the pressure, temperature, and density of the inlet gas. Thus, by holding the temperature and pressure of the inlet gas constant, the density of the inlet gas can be determined by measuring the temperature of the cold gas passing through conduit 26. The thermocouple 24 mounted at the end of the cold gas conduit 26 in conjunction with a temperature potentiometer can thus effectively determine the density of the gas passing through the device 12. The density measuring capabilities of the device 12 depend upon gas dynamic characteristics. Gases, of various density, vary in behavior as a function of density. The temperature of the output gas from the vortex 42, all other conditions remaining constant, will vary as the gas density varies. The device 12 is particularly advantageous for use in the circuit breaker field on $SF_6$ breakers where the presence of air can seriously affect the breakers operation and where the ratio of densities, air to $SF_6$, is very great. In these instances the device can be used to quickly and easily detect the presence of an air $SF_6$ mixture at reasonable levels.

Referring now to FIG. 12, there are shown curves for $SF_6$ and air representing the cold exit 26 gas temperature as a function of the inlet gas pressure with all other parameters held constant. The curve for air is a plot of the temperatures developed for given inlet air pressures with all other parameters remaining constant. The curve for $SF_6$ is a plot of the temperatures developed for given inlet $SF_6$ gas pressures with all other parameters remaining constant. Thus the temperature difference between the curves at a given pressure, with all other conditions held constant, clearly is an indication of the density of the gas passing through the vortex. For example, the outlet temperature of the cold gas conduit 26 at an inlet pressure of 80 psi varies from minus 11°C for $SF_6$ to minus 33°C for air. Thus the outlet temperature of a mixture of $SF_6$ and air at 80 psi would fall somewhere in-between minus 11°C and minus 33°C, on line 48, and thus give an indication of the degree to which the SF$_6$ is contaminated by air. That is, the outlet temperature of an SF$_6$ air mixture at 80 psi would indicate the percentage of air contained in the mixture. The curves shown in FIG. 12 can also be determined at various temperatures, thus a family of curves for various temperatures and pressures can be compiled. To determine the density of a gas one would then refer to the curve from the family of curves which represented the known parameters of the input gas, and correlate output temperature with density.

In SF$_6$ circuit breakers, it is important to note if the SF$_6$ is contaminated by air, and the amount of air contamination. Air in the SF$_6$ adversely affects the dielectric properties of the gas mixture so that the withstand voltage is decreased and the current interrupting ability of the breaker is decreased. Thus device 12 can be used for a quick good, no good indication of the dielectric properties of an insulating gas in a circuit breaker.

Device 12 can also be used to determine the dew point of a gas. As can best be seen in FIG. 6 the thermocouple 24 for measuring the temperature of the gas leaving the cold gas conduit 26 has a large flat surface area 50. The outward facing surface 50 of the thermocouple 24 is smooth and polished so that the formation of dew can be readily determined. For measuring the dew point the vortex tube or Hilsch tube is used simply as a simple source of low temperature. As the cold gas expands out of the cold gas exit 26 it cools the thermocouple 24, which has an especially large surface area 50. The thermocouple 24 continually senses the temperature of the cold gas. The cold gas temperature can be lowered by increasing the inlet gas pressure, within the limits of the Hilsch tube design. As the temperature goes down and the thermocouple 24 reaches dew point, frost will form indicating the dew point has been obtained. Reading this temperature with a temperature potentiometer is all that is required to determine the dew point temperature. It should be noted that the surface area 50 on which the dew forms, and the thermocouple 24 are integral so there is no time lag or temperature differential between the surface 50 on which the dew is formed and the temperature sensing device 24.

Referring now to FIG. 7, there is shown the density and dew point determining device 12 mounted in suitable enclosure with photoelectric devices for determining when the dew point is reached. A light source 52 directs a beam of light onto the polished outer surface 50 of thermocouple 24. The beam of light is reflected from the outer surface 50 when dew is not present onto the photodetector 54. The light source 52 and the photodetector 54 are connected to an instrument 56 which indicates the amount of light being received by the photodetector 54. For example with no dew or frost present the surface 50 reflects most of the light from light source 52 and the photodetector 54 received a relatively large amount of light. This is indicated by a meter in instrument 56 with the dial indication at point 58. When frost or dew forms on surface 50 of thermocouple 24 the reflectivity of surface 50 is greatly decreased and light reaching surface 50 is generally diffused. Thus the amount of light reaching the detector 54 is greatly reduced and the instrument 56 indicates this with the reading such as shown by position 60 of the indicator needle. When dew or frost is formed on surface 50 and the indicating needle instrument 56 moves from position 58 to position 60 the temperature sensed by thermocouple 24 can be read to determine the dew point. Temperature of the thermocouple 24 can be determined manually, or an automatic temperature recording potentiometer can be operated by instrument 56, when the indicator moves from position 58 to position 60.

Referring now to FIGS. 7, 8 and 9, there is shown a portable unit 61 which can be used for determining the density and dew point of the gas in various circuit breakers. The type of device is especially useful for field checking SF$_6$ dual pressure circuit breakers. The density determining device 12 is mounted in a suitable enclosure 62 which has a handle 65 for ease of transportation. The device shown in FIGS. 7, 8 and 9 can be used with any compressed gas type circuit breaker. For example, the device could be used on a circuit breaker as described in U.S. Pat. No. 3,379,847, issued Apr. 23, 1968 to F. A. Azinger, Jr. and assigned to the same assignee as the present application. When used with this type of circuit breaker the enclosure 62 must withstand a gas pressure of 45 psi, which is the pressure of the low pressure gas in this type of breaker. The portable unit 61 has a high pressure inlet 64, a vacuum connection 66, and a low pressure outlet 68. The vacuum connection 66 is used to remove substantially all air from the enclosure 62 before checking the density and dew point of the insulating gas such as SF$_6$ used in the circuit breaker under test. Air is removed from unit 61 before testing so that the insulating gas is not contaminated by the air while being tested. With all air removed from enclosure 62 the low pressure outlet 68 is open to a low pressure portion of the breaker under test. High pressure insulating gas is then introduced through the high pressure inlet 64. The density and the dew point of the insulating gas under test are determined as described hereinbefore in detail. Output leads from the thermocouple 24 are connected to an electrical plug connector 70, to which a temperature potentiometer can be connected in order to read the temperature sensed by thermocouple 24. For use in determining dew point a window 72 is provided in one end of the enclosure 62. The polished surface 50 of thermocouple 24 can be observed through windows 72 to determine when dew or frost is formed, and at this point the temperature can be read to determine dew point.

Due to the simple, rugged, low cost construction of this density determining device 12, it is feasible to permanently mount the device 12 inside of a gas type circuit breaker as shown in FIGS. 10 and 11. FIGS. 10 and 11 show a portion of the circuit breaker generally of the type described in U.S. Pat. No. 3,057,983, issued Oct. 9, 1962 to R. N. Yeckley, J. Sucha, and B. P. Baker and assigned to the Westinghouse Electric Corporation. It is to be understood that the locations for the device 12 shown in FIGS. 10 and 11 are alternates. There are many other possible locations, these two are only shown to illustrate the general idea of mounting the device 12 permanently inside of a gas type circuit breaker.

Referring now to FIG. 10, the device 12 is mounted in a low gas pressure environment 74. The device 12 has a fixed opening at the end of the hot gas exit tubes 16 as shown in FIG. 3. This is advantageous since it is desirable that device 12 have no moving or adjustable parts within the breaker 71. The density determining device 12 is fed from a high pressure gas supply 76 through a line 32 and a valve 34. A window 78 is provided in the low pressure tank 74 for observation of the flat thermocouple 24 to determine when dew is formed. Operation of the device 12 to determine density and dew point is as has been described hereinbefore in detail.

Referring now to FIG. 11 there is shown the device 12 mounted in an alternate location on the low pressure tank 74. Operation of the device 12 is the same as was described hereinbefore.

The described invention has several advantages over the prior art, it is rugged, simple and inexpensive. It can easily be designed into a standard gas system of the circuit breaker. Another advantage is that it has no moving parts which lead to a simplified operation. Still another advantage is that when the device is used as a dew point indicator the temperature sensing device and the surface on which the dew is formed are integral thus eliminating any time delay or temperature differential, as is present in prior art, between the temperature sensing means and the surface on which dew or frost is formed.

Since numerous changes may be made in the above described apparatus and different embodiments of the invention made without departing from the spirit and scope thereof, it is intended that all the matter contained in the foregoing description or shown in the accompanying drawings shall be interpreted as illustrative and not in a limiting sense.

What is claimed is:

1. An instrument for determining the density and dew point of a mixture of gas comprising, a Hilsch type vortex tube for separating said mixture of gas into a hot gas portion and a cold gas portion, gas supply means connected to said Hilsch type vortex tube for supplying said gas mixture to said Hilsch type vortex tube and having a shut off valve connected in the supply to said Hilsch type vortex tube, means for conducting said cold gas portion away from said Hilsch tube, a thermocouple mounted near the open end of said cold gas conducting means so that said cold gas portion contacts said thermocouple, said thermocouple having a relatively large, flat surface area, said large flat surface area of said thermocouple being smooth and polished to facilitate the formation and detection of dew.

2. The instrument as claimed in claim 1 including a means for conducting said hot gas portion away from said Hilsch tube, a fixed orifice mounted at the free end of said hot gas conducting means.

3. A method of determining the amount of air contamination of an insulating gas in a gas circuit interrupter comprising the steps of:

a. introducing the gas mixture under examination, at a known temperature and pressure, into a vortex type device which separates the gas mixture into a hot portion and a cold portion;
b. measuring the temperature of the cold portion of the gas mixture under examination;
c. determining the temperature of the cold portion of air when introduced into the vortex type device at the known temperature and pressure;
d. determining the temperature of the cold portion of the insulating gas when introduced into the vortex type device at the known temperature and pressure;
e. comparing the temperature of the cold portion of the gas mixture under examination with the predetermined temperature of the cold portion of air passed through the vortex type device at the known temperature and pressure, and with the predetermined temperature of the cold portion of said insulating gas passed through the vortex type device at the known temperature and pressure; and
f. extrapolating the amount of air contamination of said insulating gas.

4. A dual pressure type of gas blast circuit interrupter including means defining a first gas space at one pressure and a second gas space at a higher pressure, a conducting means for passing a gas from said high pressure chamber to said low pressure chamber, a Hilsch type vortex tube for separating said high pressure gas into a hot gas portion and a cold gas portion, control valve means connected between said conducting means and said Hilsch type vortex tube for controlling the flow of higher pressure gas to the Hilsch type vortex tube, said Hilsch type vortex tube being mounted in said low pressure chamber, means for conducting said cold gas portion away from said Hilsch tube, a thermocouple mounted near the open end of said cold gas conducting means so that said cold gas portion contacts said thermocouple, said thermocouple having a relatively large flat surface area, said large flat surface area of said thermocouple being smooth and polished to facilitate the formation and detection of dew, and a window in said low pressure chamber for observing said polished surface of said thermocouple to determine dew formation, said thermocouple also being used to determine the density of the insulating gas mixture.

5. A circuit breaker as claimed in claim 4 wherein: said housing contains an insulating gas comprising $SF_6$.

* * * * *